United States Patent [19]

Brock

[11] Patent Number: 4,678,158

[45] Date of Patent: Jul. 7, 1987

[54] INJECTION MOLD INCLUDING MOLD SIDEWALL LOCKING BARS

[75] Inventor: Robert E. Brock, Mukwonago, Wis.

[73] Assignee: Triangle Tool Corporation, Brookfield, Wis.

[21] Appl. No.: 802,353

[22] Filed: Nov. 21, 1985

[51] Int. Cl.⁴ .................. B29C 45/33; B29C 39/34
[52] U.S. Cl. .................................... 249/161; 249/142; 249/144; 425/441; 425/450.1; 425/451.9
[58] Field of Search .............. 425/575, 589, 595, 441, 425/450.1, 451.9, 577; 249/66 R, 160, 161, 166, 142, 144

[56] References Cited

U.S. PATENT DOCUMENTS

| | | | |
|---|---|---|---|
| 2,292,593 | 8/1942 | Amigo | 425/190 |
| 3,278,252 | 12/1966 | Bromley | 352/72 |
| 3,309,739 | 3/1967 | Trueblood | 425/589 |
| 3,373,460 | 3/1968 | Ladney | 425/416 |
| 3,473,197 | 10/1969 | Wilds et al. | 425/577 |
| 3,509,603 | 5/1970 | Halsall | 425/577 |
| 3,534,443 | 10/1970 | Tucker | 425/443 |
| 3,585,690 | 6/1971 | Tucker | 425/139 |
| 3,608,133 | 9/1971 | Cyriax et al. | 425/441 |
| 3,838,960 | 10/1974 | Lovejoy | 425/241 |
| 3,865,529 | 2/1975 | Guzzo | 425/556 |
| 3,905,740 | 9/1975 | Lovejoy | 425/438 |
| 3,930,780 | 1/1976 | Lovejoy | 425/249 |
| 3,973,891 | 8/1976 | Yamada | 425/575 |
| 4,206,799 | 6/1980 | McDonald | 164/341 |
| 4,278,417 | 7/1981 | Wilds et al. | 425/577 |
| 4,362,291 | 12/1982 | Fuke et al. | 249/144 |
| 4,503,933 | 4/1986 | Woelfel et al. | 425/441 |

*Primary Examiner*—Willard E. Hoag
*Attorney, Agent, or Firm*—Michael, Best & Friedrich

[57] ABSTRACT

An injection mold assembly including a plurality of locking bars for securing the mold sidewalls in a mold closed position. The locking bars project from one mold plate and are positioned outwardly of the mold sidewalls and include ends adapted to engage the other mold plate when the mold is closed and to function as wedges preventing outward movement of the mold sidewalls.

13 Claims, 4 Drawing Figures

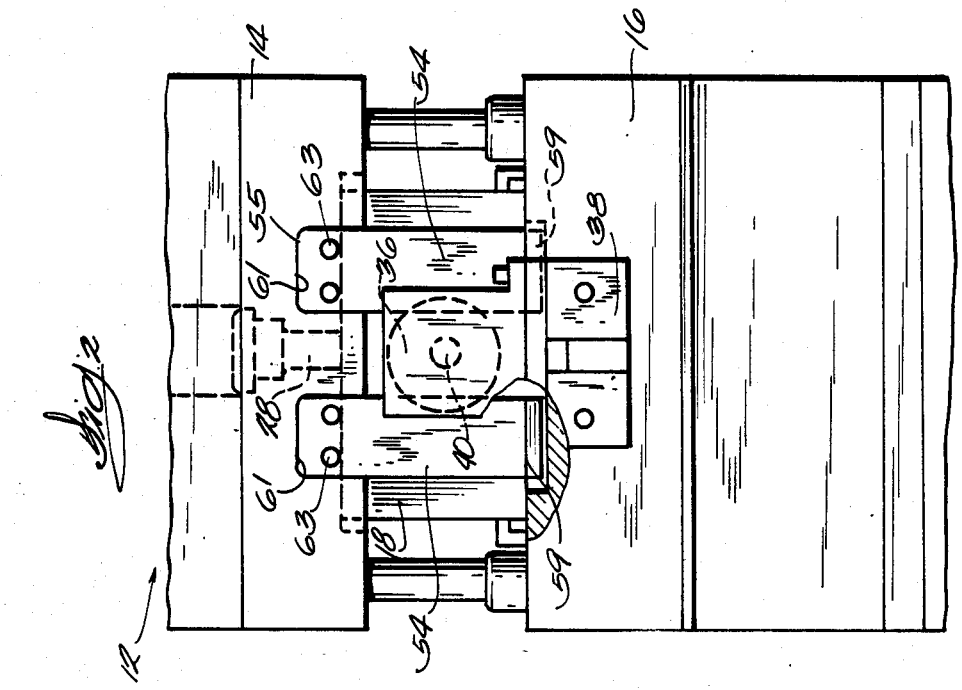
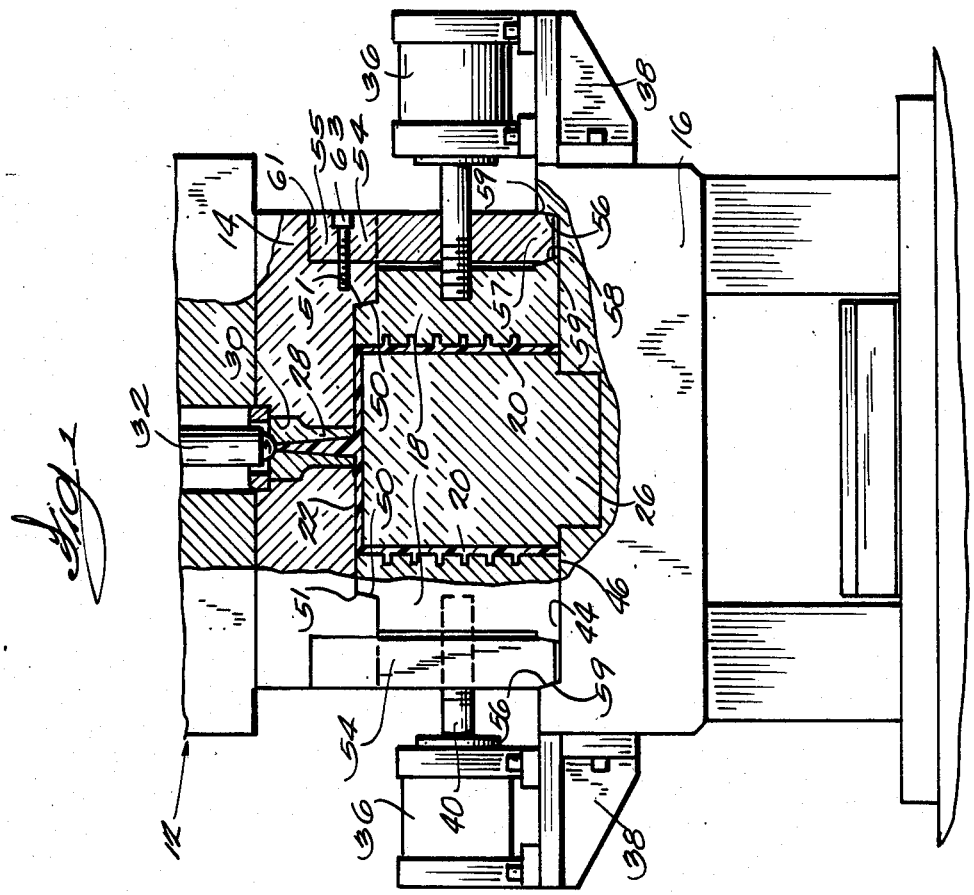

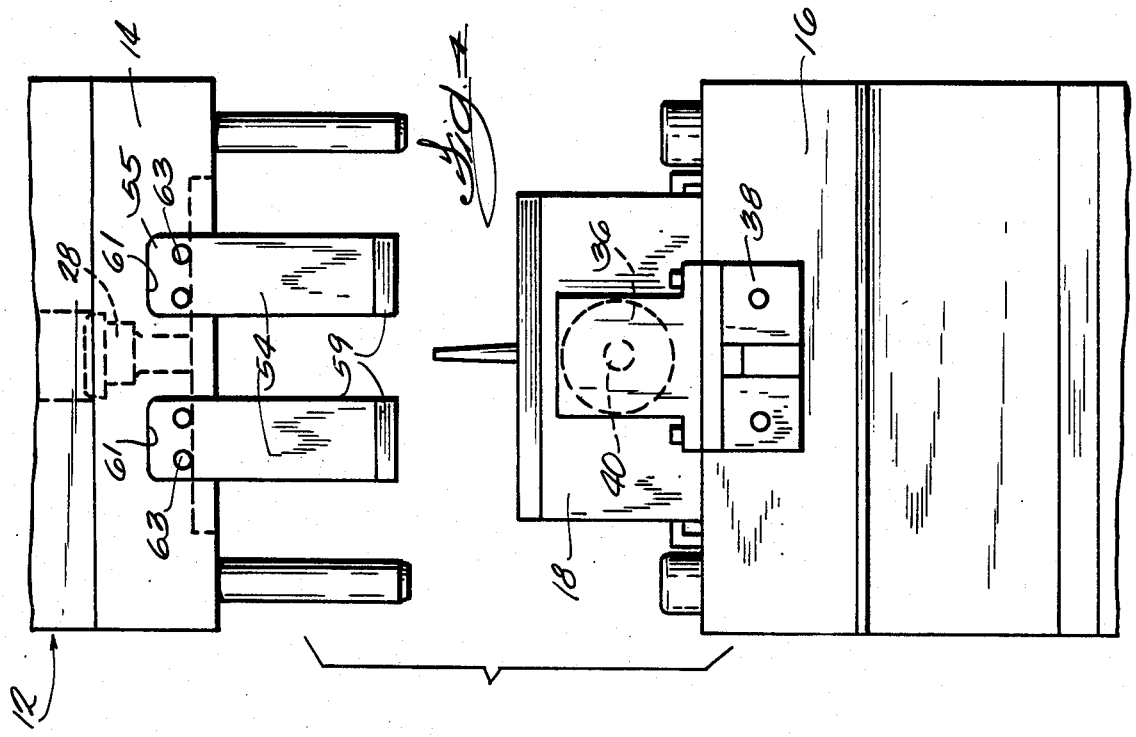
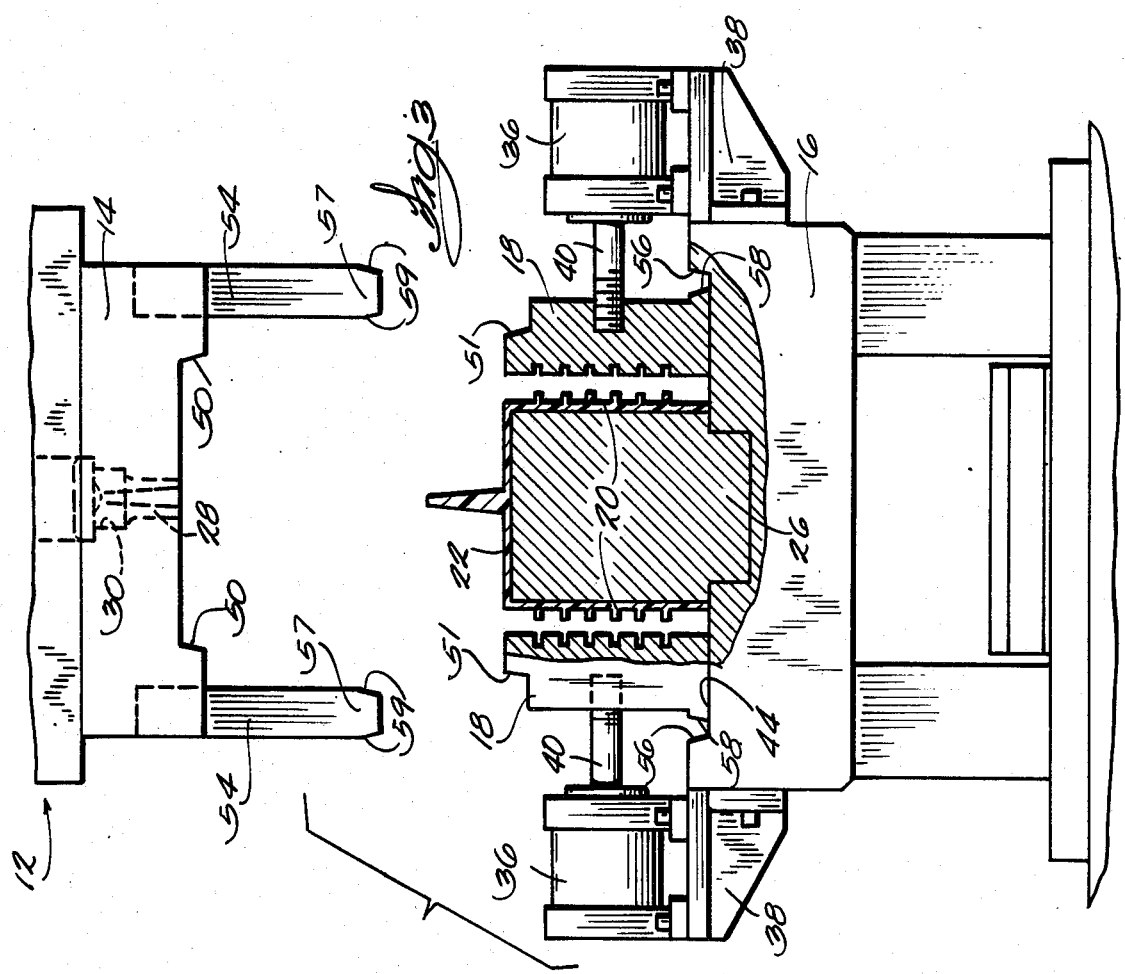

INJECTION MOLD INCLUDING MOLD SIDEWALL LOCKING BARS

FIELD OF THE INVENTION

The present invention relates to injection molds and more particularly to mold sidewalls and apparatus for supporting mold sidewalls during injection of plastic into a mold cavity.

BACKGROUND PRIOR ART

Prior art injection molding machines commonly include a large, one piece yoke surrounding the mold sidewalls, the yoke being intended to prevent outward deflection of the mold sidewalls during injection of plastic into the mold cavity. One example of such prior art apparatus is illustrated in the Halsall U.S. Pat. No. 3,509,603, issued May 5, 1970. That patent illustrates an injection mold which includes a yoke integral with one of the mold plates and surrounding a plurality of outwardly moveable sidewalls, the yoke providing support for the sidewalls during the injection process. The construction of a mold such as illustrated in the Halsall patent requires machining of a large block of steel so as to provide a central cavity in the block of steel, the cavity being large enough to house the mold cores and the mold sidewalls. The yoke provides an integral one piece rigid structure completely surrounding the mold cavity and is intended to provide rigidity to prevent any outward deflection of the mold sidewalls.

Attention is also directed to the Lovejoy U.S. Pat. No. 3,930,780, issued Jan. 6, 1976 and showing a mold structure similar to that shown in the Halsall patent and also including a one piece integral yoke having a central bore and surrounding the mold sidewalls. The yoke of Lovejoy is constructed from a thick plate of steel machined so as to form a central cavity, the cavity housing the mold cores and the moveable mold sidewalls.

Attention is also directed to the McDonald U.S. Pat. No. 4,206,799, issued June 10, 1980.

Attention is further directed to the Wilds et al. U.S. Pat. No. 3,473,197 issued Oct. 21, 1969; the Bromley U.S. Pat. No. 3,278,252, issued Dec. 6, 1966; the Lovejoy U.S. Pat. No. 3,905,740, issued Sept. 16, 1975; the Ladney U.S. Pat. No. 3,373,460 issued Mar. 19, 1968 and the Lovejoy U.S. Pat. No. 3,838,960 issued Oct. 21, 1974.

Attention is further directed to the Wilds et al. U.S. Pat. No. 4,278,417; the Amigo U.S. Pat. No. 2,292,593 issued Aug. 11, 1942; the Tucker U.S. Pat. No. 3,534,443, issued Oct. 20, 1970; the Guzzo U.S. Pat. No. 3,865,529, issued Feb. 11, 1975; the Fuke et al. U.S. Pat. No. 4,362,291 issued Dec. 7, 1982; and the Tucker U.S. Pat. No. 3,585,690, issued June 22, 1971.

SUMMARY OF THE INVENTION

The present invention provides an improved mold assembly having improved means for supporting the mold sidewalls against outward deflection when the mold is closed.

More particularly, the apparatus comprising the present invention includes a mold assembly having a first mold plate and a second mold plate movable toward and away from each other between an open position and a mold closed position, and a plurality of mold sidewalls positioned between the mold plates and moveable between a mold open position and a mold closed position wherein the sidewalls define a mold cavity. The sidewalls each include a first portion adjacent the first mold plate when the mold is closed and a second portion adjacent the second mold plate when the mold is closed. Means are also provided for locking the mold sidewalls in the mold closed position, the locking means including a locking bar having one end fixed to the first mold plate and the other end extending toward the second mold plate and adapted to be wedged between a portion of the sidewall and a portion of the second mold plate when the first and second mold plates and the sidewalls are in the mold closed position and to thereby prevent movement of the sidewall with respect to the second mold plate.

In one embodiment of the invention the means for causing movement of the sidewalls between the closed position and the open position comprises fluid cylinders connected to the sidewalls, and wherein a pair of locking bars are provided for securing each one of the sidewalls in place, the locking bars extending from the first mold plate and being positioned on opposite sides of the fluid cylinders.

In one embodiment of the invention the sidewalls are positioned against a surface of the second mold plate and are moveable along that surface in a direction substantially perpendicular to the direction of movement of the mold plates.

In one preferred form of the invention a cam surface portion of the first mold plate extends from the surface of the first mold plate outwardly and toward the second mold plate, and the first portion of at least one of the sidewalls includes a surface sloping toward the second mold plate and outwardly and being adapted to be engaged by the cam surface portion of the first mold plate when the mold plates are in the mold closed position, to thereby cause the first portion of that sidewall to be secured in the mold closed position.

In a preferred form of the invention the cam surface portion of the second mold plate slopes toward the first mold plate and outwardly, and the second surface portion of the sidewall slopes toward the first mold plate and inwardly toward the mold cavity, and one end of the locking bar comprises a wedge having a first wedge surface adapted to engage the cam surface portion of the second mold plate and a second wedge surface adapted to engage the second surface portion of the sidewall when the mold is closed.

The present invention provides an improved means for supporting the sidewalls of an injection mold to prevent outward deflection of the mold sidewalls during the molding process. Whereas in the prior art, the mold assemblies commonly require use of a yoke comprised of a thick plate of steel machined to include a central bore, in the present invention a plurality of locking bars are provided in combination with cam surfaces provided on the mold plate and on the mold sidewalls to function to wedge the sidewalls in place and thereby preclude any outward deflection of the sidewalls. The locking bars facilitate elimination of the conventional yoked in the mold assembly. The locking bars and their attachment to the mold assembly are substantially less expensive to manufacture than an integral one piece yoke surrounding the sidewalls. Substantially less material is required, and the machining steps required to accurately machine a bore in a large plate of steel are eliminated. Additionally, use of the locking bars as opposed to a yoke can facilitate the use of mold plates having a smaller cross sectional plate area since the mold plates do not need a large peripheral portion for supporting the yoke. This facilitates manufacture of a mold assembly at further savings. Additionally, the smaller mold assembly can be used in a smaller mold press, and this provides further economies in that the smaller mold presses are less expensive than those required to house mold assemblies having large mold plates.

Various other features and advantages of the invention will be apparent by reference to the following description of a preferred embodiment, from the claims and from the drawings.

BRIEF DESCRIPTION OF THE DRAWINGS

FIG. 1 is a cross section view of an injection mold assembly embodying the invention.

FIG. 2 is a side view of the injection mold assembly shown in FIG. 1 and with portions broken away.

FIG. 3 is a view similar to FIG. 1 and with the mold assembly open.

FIG. 4 is a view similar to FIG. 2 and showing the mold assembly open.

Before describing a preferred embodiment of the invention in detail, it is to be understood that the invention is not limited in its application to the details of construction and to the arrangement set forth in the following description nor illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an injection mold assembly 10 including a pair of opposed mold plates 14 and 16 supported by a conventional mold press 12 for movement toward and away from each other and between an injection molding position shown in FIGS. 1 and 2 and a mold open position shown in FIGS. 3–4. The injection mold assembly 10 also includes a plurality of mold sidewalls 18 supported for movement in a direction generally perpendicular to the direction of movement of mold plates 14 and 16 and between a molding position as shown in FIG. 1 and wherein the sidewalls 18 form mold surfaces 20 for forming the sides of a molded product 22 and a retracted position wherein the sidewalls 18 are spaced outwardly from their molding position (FIG. 3.)

The mold assembly 10 also includes mold cores 26 projecting from one of the mold plates 16 and defining the interior surfaces of the molded product 22. The mold assembly 10 also includes a conventional sprue bushing 28 housed in an aperture or central bore 30 of the mold plate 14 and defining means for delivering plastic from an injection nozzle 32 to the mold cavity.

Means are also provided for causing reciprocal movement of the mold sidewalls 18 between the closed position shown in FIG. 1 and the open position illustrated in FIG. 3 when the mold assembly is opened. In the illustrated construction the means for causing such reciprocal movement comprises a plurality of fluid cylinders 36 supported by brackets 38, in turn supported by the mold plate 16. The fluid cylinders 36 include inwardly projecting pistons 40 fixed to the sidewalls 18 such that the reciprocal movement of the pistons 40 causes reciprocal movement of the mold sidewalls 18 toward and away from the mold cores 26 and in a direction parallel to the plane defined by the end wall 44 of the mold plate 16 and such that a surface portion 46 of each sidewall 18 slides across the end wall 44 of the second mold plate.

Means are also provided for securing the mold sidewalls 18 in a closed position when the mold is closed and to prevent outward deflection of the mold sidewalls 18 during the injection process. The means for securing the mold sidewalls 18 in the closed postion includes a cavity in the mold plate 14, the cavity having a periphery defining sloping cam surfaces 50 and adapted to mate with and engage corresponding or facing sloping cam surfaces 51 provided in respective portions of the mold sidewalls adjacent the first mold plate 14 and adapted to be housed in the cavity provided in the mold plate 14.

The means for securing the mold sidewalls 18 in place also includes a plurality of locking bars 54, each locking bar 54 including one end 55 secured to the mold plate 14 and an opposite end 57 adapted to be wedged between cam surfaces 56 of the other of the mold plate and cam surfaces 58 provided on the outside portion of the mold sidewall 18 adjacent the second mold plate 16. While the locking bars 54 could be secured to the mold plate 14 in other ways, in the illustrated arrangement the ends 55 of the locking bars are housed in cavities 61 provided in the mold plate 14 and are secured therein by bolts 63. While in other arrangements the number and location of the locking bars 54 could be varied, in the illustrated construction a pair of locking bars 54 are secured to each side of the mold plate 14 and are positioned in spaced apart relation and such that when the mold is closed, the locking bars 54 are positioned on opposite sides of the pistons 40 and fluid motors 36.

In the illustrated arrangement, the end 57 of each locking bar 54 engaging the surface 56 of the mold plate 16 and the surface 58 of the adjacent mold sidewall includes a pair of cam surfaces 59, the cam surfaces 59 being on opposite sides of the locking bar 54 and converging. The outer cam surface 58 of the mold sidewall 18 adjacent the mold plate 16 is complementary to the opposed facing cam surface 59 of the end 57 of the locking bar 54. The cam surface 56 of the mold plate 16 is similarly in opposed facing relation to the other cam surface 59 of the end of the locking bar. The cam surface 56 of the mold plate slopes away from the surface 44 of the mold plate 16 and outwardly, and the cam surface 58 of the sidewall 18 slopes away from the face 44 of the mold plate 16 and inwardly.

In operation, the wedge-shaped end 57 of the locking bar 54 extends between the opposed facing cam surfaces 58 and 56 of the mold plate 16 and the sidewall 18, respectively, so as to provide a means for securing that portion of the sidewall 18 adjacent the mold plate 16 from deflecting outwardly during the injection of plastic into the mold, and such that the sidewalls are provided with support equivalent to the that provided by a solid one piece yoke completely surroundng the mold sidewalls. The opposite end of the mold sidewall 18, i.e., that end adjacent the other mold plate 14, is similarly prevented from outward movement by the engagement of the cam surface 50 of the mold plate 14 against the opposed outwardly facing surface 51 of the mold sidewall 18.

The injection mold assembly 10 embodying the invention can be substantially less expensive to manufacture than prior art mold assemblies having a large one piece yoke surrounding the mold sidewalls to support the mold sidewalls against outward deflection. The size of the mold platens can be substantially reduced because the sidewalls 18 are not surrounded by a one-piece thick walled yoke of the type employed in the prior art structures. Since the size of the mold plates 14 and 16 can be reduced, the mold assembly can be used in a mold press of reduced size. The reduction in size of the mold plate yields economies in the manufacture of the mold assembly and further efficiency is realized because the mold assembly can be used in a smaller, less expensive mold press.

Various features of the invention are set forth in the following claims.

I claim:

1. A mold assembly comprising
   a first mold plate,
   a second mold plate,
   means for supporting said first and second mold plates for movement toward and away from each other between a mold open position and a mold closed position,
   a plurality of mold sidewalls positioned between said first mold plate and said second mold plate, said sidewalls being moveable in a direction generally transverse to the direction of movement of said first and second mold plates with respect to each other and between a mold open position and a mold closed position wherein said sidewalls define a mold cavity, said sidewalls each including a first portion adjacent said first mold plate and a second portion adjacent said second mold plate, and
   means for locking said mold sidewalls in said mold closed position, said means for locking including a locking bar having opposite ends, one of said ends being fixed to said first mold plate and the other of said opposite ends of said locking bar extending toward said second mold plate and being wedged between said second portion of one of said sidewalls and a portion of said second mold plate when said first and second mold plates are in said mold closed position and when said sidewalls are in said mold closed position and to prevent outward movement of said second portion of said one of said sidewalls with respect to said second mold plate.

2. A mold assembly as set forth in claim 1 wherein the other of said opposite ends of said bar comprises a wedge adapted to be positioned between said second portion of said one of said sidewalls and said second mold plate when said first mold plate and said second mold plate are moved to said mold closed position.

3. A mold assembly as set forth in claim 1 and further including means for causing movement of said one of said mold sidewalls between said mold closed position and said mold open position, said means for causing movement including at least one fluid cylinder connected to said one of said sidewalls, and wherein said means for locking includes a second locking bar extending from said first mold plate, said locking bars being positioned on opposite sides of said fluid cylinder.

4. A mold assembly as set forth in claim 3 wherein said one of said sidewalls is positioned against a surface of said second mold plate for slideable reciprocal movement between said mold closed position and said mold open position, said movement being in a direction substantially perpendicular to movement of said first mold plate and said second mold plate between said mold open position and said mold closed position.

5. A mold assembly as set forth in claim 1 wherein said first mold plate includes a surface portion facing said second mold plate and a cam surface portion, said cam surface portion of said first mold plate extending toward said second mold plate and outwardly, and wherein said first portion of said one of said sidewalls includes a cam surface sloping toward said second mold plate and outwardly and being adapted to be engaged by said cam surface portion of said first mold plate when said mold plates are in said mold closed position whereby said first portion of said one of said sidewalls will be prevented from outward movement when said first mold plate and said second mold plate are in said mold closed position.

6. A mold assembly as set forth in claim 5 wherein said second mold plate includes a surface portion sloping toward said first mold plate and outwardly, wherein said second surface portion of said one of said sidewall slopes toward said first mold plate and inwardly toward said mold cavity, and wherein said other of said opposite ends of said locking bar comprises a wedge having a first wedge surface adapted to engage said surface portion of said second mold plate and a second wedge surface adapted to engage said second surface portion of said one of said sidewalls when said mold is closed whereby said second portion of said one of said sidewalls is prevented from outward movement with respect to said second mold plate.

7. A mold assembly as set forth in claim 1 wherein said locking bar is positioned outwardly of said one of said mold sidewalls with respect to said mold cavity.

8. A mold assembly comprising
   a first mold plate,
   a second mold plate,
   means for supporting said first mold plate and said second mold plate for movement toward and away from each other between a mold open position and a mold closed position,
   a mold sidewall positioned between said first mold plate and said second mold plate, said sidewall being moveable in a direction generally transverse to the direction of movement of said first and second mold plates with respect to each other between an open position and a mold closed position, said sidewall including a first portion adjacent said first mold plate and a second portion adjacent said second mold plate, said first portion of said sidewall including a cam surface sloping toward said second mold plate and outwardly,
   means for locking said first portion of said sidewall in said mold closed position, said means for locking including a sidewall engaging surface portion of said first mold plate engaging said cam surface of said first portion of said sidewall when said first mold plate and said second mold plate are closed, and
   means for locking said second portion of said sidewall in said molding position when said mold is closed, said means for locking including a wedge supported by said first mold plate and positioned between said second portion of said sidewall and a portion of said second mold plate when said mold is closed.

9. A mold assembly as set forth in claim 8 wherein said sidewall engaging surface portion of said first mold plate slopes toward said second mold plate and outwardly and is adapted to engage said sidewall cam portion when said mold is closed to hold said sidewall in said molding position.

10. A mold assembly as set forth in claim 8 wherein said second mold plate includes an inclined cam surface outwardly of said mold sidewall and adapted to be engaged by said wedge when said mold is closed.

11. A mold assembly as set forth in claim 10 wherein said second mold plate inclined cam surface slopes toward said first mold plate and outwardly and wherein said second portion of said sidewall includes a cam surface sloping toward said first mold plate and inwardly, said cam surface of said second portion of said sidewall being in inwardly opposed spaced relation from said inclined cam surface of said second mold plate.

12. A mold assembly as set forth in claim 8 wherein said means for locking includes a locking bar having opposite ends, one of said opposite ends being fixed to said first mold plate and another of said opposite ends defining said wedge.

13. A mold assembly as set forth in claim 12 wherein said first mold plate includes side surfaces and wherein said one of said ends is fixed to said one of said side surfaces of said first mold plate, and wherein said locking bar is positioned outwardly of said mold sidewall.

* * * * *